United States Patent [19]

Cherukuri et al.

[11] Patent Number: 4,722,845
[45] Date of Patent: Feb. 2, 1988

[54] STABLE CINNAMON-FLAVORED CHEWING GUM COMPOSITION

[75] Inventors: Subraman R. Cherukuri, Towaco, N.J.; Gul Mansukhani, Staten Island, N.Y.; Kapakkamannil C. Jacob, Hackettstown, N.J.

[73] Assignee: Warner-Lambert Company, Morris Plains, N.J.

[21] Appl. No.: 945,745

[22] Filed: Dec. 23, 1986

[51] Int. Cl.$^4$ ................................................ A23G 3/30
[52] U.S. Cl. ........................................ 426/5; 426/103; 426/99; 426/548; 426/302; 426/303; 426/453
[58] Field of Search ............... 426/3, 5, 4, 6, 548, 426/453, 658, 103, 99, 96, 94, 302, 303

[56] References Cited

U.S. PATENT DOCUMENTS

| 3,949,094 | 4/1976 | Johnson | 426/99 |
| 4,105,801 | 8/1978 | Dogliotti | 426/99 |
| 4,293,570 | 10/1981 | Vadasz | 426/548 |
| 4,382,924 | 5/1983 | Berling et al. | 426/548 |
| 4,384,004 | 5/1983 | Cea et al. | 426/548 |
| 4,465,694 | 8/1984 | Okada | 426/99 |
| 4,536,410 | 8/1985 | Vaccaro | 426/548 |
| 4,597,970 | 7/1986 | Sharma | 426/548 |
| 4,608,263 | 8/1986 | Bergin | 426/548 |
| 4,634,593 | 1/1987 | Stroz | 426/548 |

Primary Examiner—Jeanette Hunter
Attorney, Agent, or Firm—Daniel A. Scola, Jr.; Gary M. Nath

[57] ABSTRACT

A stable cinnamon-flavored chewing gum composition comprising a gum base, cinnamon flavor and a sweetener delivery system comprising a dipeptide or amino acid sweetener encapsulated in a mixture of fat and high melting point (106°) polyethylene wax.

9 Claims, No Drawings

STABLE CINNAMON-FLAVORED CHEWING GUM COMPOSITION

FIELD OF THE INVENTION

This invention relates to stable cinnamon flavored chewing gum compositions containing artificial sweeteners such as dipeptide and amino acid sweeteners. More particularly this invention relates to chewing gum compositions containing sweetener delivery systems which prevent the interaction of the cinnamon flavors with the sweeteners.

BACKGROUND OF THE INVENTION

Cinnamon flavors have long been known to be very reactive with certain ingredients in chewing gum compositions, causing the final gum product to exhibit one form or another of instability. Instability may manifest itself in a number of different ways, such as by staling, changes in texture, taste color and the like. Degradation of certain sweeteners such as aspartame in the presence of cinnamon flavors is one example of the difficulties encountered when attempting to make sugarless cinnamon flavored gums.

Numerous attempts in the art to formulate coatings for protecting sweeteners such as aspartame have been disclosed. One such attempt is found in U.S. Pat. No. 4,597,970, whereby an effective sweetener delivery system is provided which protects the sweetener from reactive ingredients such as cinnamon flavors. This patent has a distinct drawback in that discoloration occurs upon storage when cinnamon flavors are present. This is believed to be due to the reaction between the cinnamon flavor, aspartame and lecithin, which is taught by this reference as being critical to the final coating. The instant invention overcomes the disadvantage of this reference by providing for a delivery system which is effective without the incorporation of lecithin in the coating matrix.

EPA 81110320.0, published June 16, 1982 (Publication No. 0053844), to Ajinomoto Co., Inc., discloses a stabilized dipeptide-based sweetening composition comprising (a) from 20 to 60% by weight of solid fat, (b) from 10 to 30% by weight emulsifier, (c) from 10 to 30% by weight polysaccharide and (d) not more than 30% by weight of dipeptide sweetener. The compositions are prepared by heating the mixture of the ingredients, cooling, and pulverizing to obtain powder or granules of the composition to obtain a ASTM mesh size of smaller than 12. Spray drying the mixture is also disclosed.

U.S. Pat. No. 4,105,801 to Degliotti, discloses a confectionery comprising a core portion and a shell adheringly enveloping the core portion, whereby the shell is formed by an intimate mixture of microcrystals of xylitol with a solid fatty substance in a proportion of 0.5 to 15 parts by weight of fatty substance to each 100 parts by weight of xylitol. The fatty substance is preferably a mono-, di- or triglyceride having a melting range of between 20° and 60° C.

U.S. Pat. No. 3,389,000 to Toyonaka et al., discloses protective coatings for granular nucleoside-5-phosphates, the coatings being edible fats melting between 40°–100° C. and derived from plants and animals. Hydrogenated oils such as soybean oil, cottonseed oil, almond oil, castor oil, linseed oil, mustard oil, olive oil, grapefruit seed oil, palm oil, palm kernel oil, rapeseed oil, rice bran oil and the like and mixtures thereof. This reference discloses a process of preparing the granular product from a liquid mixture of fats and nucleoside-5-phosphates which are sprayed from a pressure nozzle and the resultant granules cooked and recovered.

U.S. Pat. No. 4,382,924, to Berling, discloses liquid oral dosage forms for vitamins or pharmaceutical materials comprising an edible oil, a high potency lipid soluble sweetener such as saccharin and a lipid soluble flavorant. The edible oil may be a polyol fatty acid ester having at least four fatty acid ester groups and each fatty acid having from about 8 to about 22 carbon atoms. The oil, sweetener and flavor oil are mixed and heated and then cooled to provide a palatable liquid dosage form.

For a general discussion of spraying fatty materials onto sweeteners and the like see U.S. Pat. Nos. 3,949,094 and 3,976,794 both to Johnson, and U.S. Pat. No. 3,867,556 to Darragh. U.S. Pat. No. 4,293,572 to Silva et al., discloses the application of a dispersion of an emulsified fat with a solution of dextrin, saccharin or a polysaccharide to a food product as a barrier against moisture. U.S. Pat. No. 3,527,647 discloses a process of agglomerating particles by randomly scattering and spraying moistened particles to cause them to collide and form agglomerates.

The problem relating to stabilization of sweeteners such as aspartame, which has not been previously addressed, relates to the wettability of the aspartame crystal as well as to its morphological configuration. Aspartame is known to be rod-like, needle-like or dendritic in shape. As a result it is very difficult to coat aspartame using ordinary mixing or spray coating techniques. To be effective as protective barriers, coatings must be able to wet and adhere to the crystalline surface, including the needle-like tips and other shape variations of the aspartame. Additionally, the coating must be capable of being applied in a film with a uniform thickness sufficient to provide a barrier against degradative factors such as moisture, pH changes, temperature changes and reactive chemicals. The coatings, in addition to being protective barriers, must be flexible enough to conform to the surface irregularities and geometrical configuration without cracking due to mechanical stresses which it is subjected to during incorporation of the sweetener into specific product applications. Attempts to coat aspartame using spray techniques to apply simple mixtures of fat and lecithin have resulted in poor wetting, spotty coating and inadequate protection against moisture and other potentially degradative factors.

It has been discovered that simple mixing of known coating materials such as fats, with certain other core materials such as aspartame does not provide adequate protection to keep the core material in a stabilized state. Fats do not provide adequate coating materials, nor do such coating materials as starch, and certain other materials such as waxes. Many of these materials require solvents and moisture for application, which have adverse effects on the stability of hyrophilic instable materials such as aspartame. For example, simple mixing of aspartame in liquid mixtures of traditional coating materials, e.g., fat and lecithin, has resulted in poor wetting, spotty coating and inadequate protection against moisture and chemicals. The result was degradation of the aspartame upon exposure to these conditions. Changes in pH and temperature catalyze these degradative conditions.

The process of EPA No. 81110320.9 (Publication No. 0053844) filed Dec. 10, 1981, discussed above, is an example of simple admixing of coating materials with aspartame. This publication discloses the simple melting and admixing of from 20 to 60% of solid fat, 10 to 30% of emulsifier, 10 to 30% of polysaccharide and not more than 30% dipeptide sweetener. The mixture is then cooled and pulverized or spray dried. The pulverizing into fine powder, however, results in rupturing of the coating, leaving the aspartame exposed. Spray drying is normally associated with the driving off of moisture or solvents.

The prior art techniques for coating difficult-to-coat materials such as aspartame, has focused on two methods. The first method involves the formation of a molten mixture of the coating material with the sweetener. The mixture is then solidified by cooling and pulverized. The resultant particles represent a random attempt at completely coating or enrobing the sweetener. In the case of aspartame, this coating does not provide adequate protection against moisture or aldehyde-containing flavor oils and instability of the aspartame results.

The second conventional prior art technique for coating materials involves fluidized bed spray coating. This technique involves suspending a mass of the material to be coated into a stream of atomized droplets of coating material. In the case of materials such as aspartame, this method is very difficult. Aspartame is a low density material, has a large surface to weight ratio and poor wetting characteristics. For these reasons, spray coating of aspartame in a fluidized bed system is difficult.

The instant process is an improvement over spray congealing techniques and optionally includes additional coating steps. The resultant product exhibits a marked improvement in the effectiveness of the coating as a protective barrier. The result is a significant improvement in the stability of the core (sweetener) material.

Thus, the delivery systems of the invention and process of preparation provide an improved protective coating for core materials without occurrence of the chemical reactions between lecithin, cinnamon and aspartame.

SUMMARY OF THE INVENTION

The cinnamon-flavored chewing gum compositions of this invention having improved color, sweetener and flavor stability and comprise a gum base, a cinnamon flavor and a stable sweetener delivery system capable of effecting a controlled release of the sweetener, said delivery system comprising:
(A) a fat selected from the group consisting of hydrogenated palm oil, hydrogenated palm kernel oil, hydrogenated peanut oil, hydrogenated rapeseed oil, hydrogenated cottonseed oil, hydrogenated soybean oil, hydrogenated sunflower oil and mixtures thereof. Partially hydrogenated oils of any of the above, as well as mixtures thereof are also contemplated;
(B) an edible petroleum or synthetic polyethylene wax having a melting point of about 106° C. or greater;
(C) glyceride in the amount of about 0.5% to about 20% by weight of the total chewing gum composition; and
(D) an amino acid or dipeptide sweetener; wherein said sweetener is encapsulated by the admixture of components (A) through (C).

DETAILED DESCRIPTION OF THE INVENTION

Although this invention contemplates a delivery system for a variety of core materials and combinations thereof, it is particularly directed to providing a novel delivery system for sweeteners such as aspartame and saccharin, flavoring agents and the like to be incorporated into chewing gum compositions. It particularly solves the problem of wetting the surface and thoroughly coating the needle-like structure of the dipeptide sweetener aspartame. Additionally, the coatings are flexible enough to form protective film barriers without cracking or brittleness due to mechanical forces encountered during high speed application of the coating to the core material as well as those mechanical stresses present when incorporating the delivery system into food products. The present method of stabilizing and coating the core material involves an initial formation of an agglomerate of the core material in a hydrophobic coating matrix whereby the core material is agglomerated and oriented in the matrix to facilitate a further coating or coatings with similar or the same matrix materials. The agglomerate is formed using spray congealing techniques which create an approximate eliptical or spherical shape. The agglomerate is, of course, larger in size then the individual sweetener particles, and its shape and size as well as the composition of the matrix coating facilitate the application of the second coating. The agglomerate is screened to obtain only the desired particle size range. Agglomerates which are extremely fine, e.g., below about 200 U.S. standard mesh, are generally not useful since they are too fine to easily coat. The second coating and any additional coatings are applied using standard fluidized bed granulation techniques well known to the skilled artisan. Additionally, the inventive method involves spray congealing techniques without first forming an agglomerate. As discussed further, the spray congealing process involves feeding a molten mixture of the core material in the novel hydrophobic coating matrix of this invention through a high pressure spray nozzle, while maintaining the feed-line at a controlled temperature and adjusting the nozzle pressure to control the particle size of the spray. The resultant product takes the form of fine spherical droplets which congeal and solidify as they leave the nozzle and contact the air to form solid particles. These aggregate particles overcome the major problems associated with aspartame particles: that is, the needle-like shape is changed into a round aggregate matrix; the particle density is increased to a favorable range; and wettability is improved allowing granulation coating techniques to be effective. These particles comprise the delivery system discussed further herein.

The inventive delivery systems and compositions are useful in food products such as chewing gums, and other confectionery products, baked good, pharmaceutical preparations, beverages, tobacco and proprietary products such as toothpaste and mouthwash. Acceptable amounts may vary widely and preferably from about 0.01% to about 100% by weight of the delivery system based on the weight of the final product.

Examples of the fatty acids employed are selected from the group consisting of hydrogenated palm oil, hydrogenated palm kernel oil, hydrogenated peanut oil, hydrogenated rapeseed oil, hydrogenated rice bran oil, hydrogenated soybean oil, hydrogenated cottonseed oil, hydrogenated sunflower oil and mixtures thereof.

Those waxes which are useful include petroleum waxes and synthetic waxes having a melting point within the range of about 106° C. or greater and being edible. Polyethylene waxes having a molecular weight of about 500 to about 10,000 are generally useful providing they fall within the aforementioned temperature range. Mixtures of these waxes may be used as well as mixtures of the waxes within the fatty acids.

The inventive delivery system uses materials which have a melting point initiation temperature which is about 5° to about 6° higher than the delivery system of U.S. Pat. No. 4,597,970. The increase in the overall melting point of the delivery system is believed to account, at least in part, for the longer lasting sweetness, since it would require a longer melting time for release.

The edible fatty materials are employed in the instant delivery systems in amounts of about 61% to about 95% by weight of the delivery system, preferably in amounts of about 63% to about 90% and most preferably in amounts of about 66% to about 80%. These amounts are necessary to adequately coat the surface of sweeteners such as aspartame which have a high surface area to weight ratio. Hydrogenated soybean oil is the most preferred fatty acid.

The edible fatty material and wax component is critical to the effectiveness of the protective barrier. The hydrophobic matrix, of which the fatty material and wax is an essential part, provides protection for the core material from heat, light, moisture, pH, reactive chemicals and the like. Additionally, the release of the core material is controlled via the hydrophobic matrix and can serve other purposes such as the masking of taste for unpalatable or unpleasant tasting materials.

The term glyceride component used herein refers to commonly identified glycerides which are esters of glycerol and fatty acids in which one or more of the hydroxyl groups of the glycerol have been replaced by acid radicals. Mono- and diglycerides are preferred, however, triglycerides are also acceptable.

The mono- or diglyceride component of the hydrophobic coating matrix serves to increase the affinity between the fatty material and wax and the core material. In addition, for core materials which are water soluble such as aspartame, the mono- or diglyceride component also serves to help the fat adhere and wet the sweetener surface. Flexibility and elasticity of the matrix once it forms the film or coating on the core material is increased due to the glyceride component.

The glycerides are present in amounts of about 0.5 to about 20% by weight of the delivery system. Preferably the glyceride is used in amounts of about 0.5 to about 7% and most preferably about 1% to about 3%. It should be recognized that mixtures of mono- and diglycerides may be used, since most available glyceride materials are mixtures of mono- and diglycerides.

The core material can be selected from a wide variety of materials such as sweeteners, medicaments, drugs, flavoring agents and the like. These materials can be used either singly or in combination in either a single or multiple delivery system. That is, one or more of these materials may be present within one coating matrix or separately coated by the matrix and employed alone or in combination in a final product.

The method of preparing the delivery system involves first forming an agglomeration of the core material and the hydrophobic matrix. The agglomerates are then screened to obtain particles of about 200 to about 30 mesh and then coated with one or more layers of hydrophobic material to provide a protective barrier. The agglomerate is formed by mixing at low shear the fatty material, i.e., fatty acid, or wax with the glyceride at temperatures of about 75° to about 95° C. until a homogeneous mixture is obtained. The core material or combination of core materials are then added to this mixture and mixed at high shear to uniformly dispense the material in the mixture. The dispersion is then fed into a heat controlled spray nozzle and spray congealed. The term spray congealing as used herein refers to the solidification of the atomized liquid droplets which cool and solidify upon hitting the cooler temperature of the surrounding atmosphere. The nozzle pressure is regulated to control the particle droplet size. The droplets cool and congeal once they are emitted from the nozzle and contact the cooler environment. The result is a dry particle or agglomerate having an approximate eliptical or spherical shape. At this stage, core material particles are bound together with the hydrophobic matrix, but not adequately coated to fully protect the core material from the environment. The agglomerated particles are then screened to the desired size as mentioned above. The second coating step of the process is usually necessary to provide the most effective protective barrier. Thus, the agglomerate is then coated using standard fluidized bed granulation procedures.

The second coating (e.g., the coating of the agglomerate) may use the hydrophobic matrix. It should be mentioned, however, that the outer coating need not have the glyceride components present since wetting of the core material surface is not critical at this point, having been accomplished in the first coating. Thus, the outer coating need only have the fatty material and wax component and preferably both. Preferably the outer coating comprises hydrogenated soybean oil and a polyethylene wax in respective amounts of about 61% to about 90% and about 10% to about 40%. The final product is a fine dry particle and is referred to herein as the delivery system. The delivery system preferably has a melting range of about 25° C. to about 96° C. and most preferably a melting range of about 46° to about 44° C., such that it melts and releases the core material within the normal body temperature range of humans.

As an alternative, but less preferred method, the homogenous mixture of the hydrophobic matrix and core material can be allowed to cook in sheets and subsequently pulverized to a particle size of about 30 to about 200 U.S. standard mesh size (about 600 to about 75 microns). The pulverized particles can then be coated with the hydrophobic mixture using standard fluidized be granulation techniques. An additional alternative method of forming the delivery system comprises spray drying the core material with a known binder such as cellulose or polyvinyl pyrrolidone and the like to form an aggregate. The aggregate is then coated with the hydrophobic coating matrix using conventional fluidized bed granulation techniques well known to the skilled artisan. These alternative methods however are not as effective in preparing the delivery systems as the preferred method.

It is important to note that the preferred inventive process involving spray congealing of the liquid hydrophobic coating matrix-core material followed by fluidized bed granulation results in a significantly and surprisingly improved coating for protection of the core material. Either spray congealing or fluidized bed granulation alone do not provide adequate protective coatings for the delivery system and results in instability and premature release of the core material. The congealing step forms an agglomerate of the core material and hydrophobic matrix. The matrix binds together the core particles but only partially coats the core. The core material is "randomly" coated in the sense that it is pure chance that the matrix completely coats or enrobes the material particularly if the material is difficult to coat.

Fluidized bed granulation is necessary to achieve the uniform coating necessary to protect the core material. For example, with rod-like or needle-like shaped sweeteners such as aspartame, the spray congealing orients the aspartame crystals into an agglomeration which is significantly easier to coat, e.g., the agglomerate approximates an eliptical or spherical shape, which is then easily uniformly coated in the fluidized bed. Fluidized bed coating alone of sweeteners such as aspartame does not provide a uniform protective coating.

A balance must be maintained, however, such that too thick a coating is not used so as to prevent proper release of the core material. It has been determined that using the exterior coating in amounts of about 200 to about 300% by weight of the agglomerate maximizes the protective benefits with the controlled release benefits. Use of the exterior coating in less than amounts of about 30% by weight of the agglomerate does not provide thickness sufficient for protection of the core material.

With regard to the chewing gum formulation in which the novel delivery system is employed, the amount of gum base employed will vary greatly depending on various factors such as the type of base used, consistency desired and other components used to make the final product. In general, amounts of about 5% to about 45% by weight of the final chewing gum composition are acceptable for use in chewing gum compositions with preferred amounts being in the range of about 15% to about 25% by weight. The gum base may be any water-insoluble gum base well known in the art. Illustrative examples of suitable polymers in gum bases include both natural and synthetic elastomers and rubbers. For example, those polymers which are suitable in gum bases, include, without limitation, substances of vegetable origin such as chicle, jelutong, gutta percha and crown gum. Synthetic elastomers such as butadienestyrene copolymers, isobutylene-isoprene copolymers, polyethylene, polyisobutylene and polyvinylacetate and mixtures thereof, are particularly useful.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood rosin, pentaerythritol ester of wood rosin, glycerol ester of wood rosin, glycerol ester of partially dimerized rosin, glycerol ester of polymerized rosin, glycerol ester of tall oil rosin, glycerol ester of wood rosin and partially hydrogenated wood rosin and partially hydrogenated methyl ester of rosin, such as polymers of alpha-pinene or beta-pinene; terpene resins including polyterpene and mixtures thereof. The solvent may be employed in an amount ranging from about 10% to about 75% and preferably about 45% to about 70% by weight of the gum base.

A variety of traditional ingredients may be incorporated such as plasticizers or softeners. Examples of these ingredients include lanolin, stearic acid, sodium stearate, potassium stearate, glyceryl triacetate, glycerine and the like. Natural waxes, petroleum waxes, polyurethane waxes, paraffin waxes and microcrystalline waxes may also be incorporated into the gum base to obtain a variety of desirable textures and consistency properties. Mixtures of these traditional ingredients are contemplated. These individual additional materials are generally employed in amounts of up to about 30% by weight and preferably in amounts of from about 3% to about 20% by weight of the final gum base composition.

The chewing gum composition may additionally include the conventional additives of flavoring agents, coloring agents such as titanium dioxide; emulsifiers such as lecithin and glyceryl monostearate; and additional fillers such as aluminum hydroxide, alumina, aluminum silicates, calcium carbonate, and talc and combinations thereof. These fillers may also be used in the gum base in various amounts. Preferably the amount of fillers when used will vary from about 4% to about 30% by weight of the final chewing gum.

In the instance where auxiliary sweeteners are utilized in addition to those in the delivery system, the present invention contemplates the inclusion of those sweeteners well known in the art, including both natural and artificial sweeteners. Thus, additional sweeteners may be chosen from the following non-limiting list: sugars such as sucrose, glucose (corn syrup), dextrose, invert sugar, fructose, and mixtures thereof; saccharine and its various salts such as the sodium or calcium salt; cyclamic acid and its various salts such as the sodium salt; the dipeptide sweeteners such as aspartame; dihydrochalcone compounds; glycyrrhizin; Stevia Rebaudiana (Stevioside); and sugar alcohols such as sorbitol, sorbitol syrup, mannitol, xylitol, and the like. Also contemplated as an additional sweetener is the nonfermentable sugar substitute (hydrogenated starch hydrolysate) which is described in U.S. Reissue Pat. No. 26,959. Also contemplated is the synthetic sweetener 3,6-dihydro-6-methyl-1-1,2,3-oxathiazin-4-one-2,2-dioxide particularly the potassium (Acesulfame-K), sodium and calcium salts thereof as described in German Patent No. 2,001,017.7. Other sweeteners and mixtures of sweeteners are contemplated.

The sweeteners in the delivery system per se, may be used in amounts necessary to impart sweetness and preferably in amounts of about 0.01 to about 30% by weight of the delivery system. Aspartame, saccharin and its salts are the preferred sweeteners and may be used in amounts of about 0.01% to about 25% and about 0.01% to 50% respectively, by weight of the delivery system. The preferred amounts of these sweeteners are about 2 to about 10%, most preferably about 4 to about 6%. Auxilary sweeteners may be used in conventional amounts based on the total weight of the chewing gum compositions, as is standard in the art.

A particularly effective combination of sweeteners is aspartame, sodium saccharin and acesulfame K (potassium acesulfame). Saccharin and its salts and acesulfame salts may be employed in amounts of about 5 to about 50% by weight of the delivery system. Aspartame is used in amounts up to about 15% by weight when used in this combination. One or more of the sweeteners may be in the encapsulated form prior to incorporation in the delivery system, thus delaying the release of the sweetener and lengthening the perceptible sweetness and/or staggering their release. Thus, the sweeteners may be incorporated such that they release sequentially.

It has also been discovered that the incorporation of the combination of two or more sweeteners used, alone or as part of the delivery system improves the sweetness intensity as a result of synergism. Exemplary examples of synergistic combinations are saccharin/aspartame; saccharin/potassium acesulfame; saccharin/aspartame/potassium acesulfame. These sweeteners can also be added to a final food, confectionery, drug or personal product independently of the delivery system. Thus, a good product may have sweetness imparted thereto attributable to the delivery system sweetness as well as those auxilary sweeteners independent of the delivery system. These combinations of sweeteners have also been discovered to impart a long lasting flavor effect to the food product such as chewing gum.

Although cinnamon is the primary flavor, other suitable flavorings include both natural and artificial flavors, and mints such as peppermint, menthol, artificial vanilla, cinnamon derivatives, various fruit flavors, used individually and in admixture are contemplated. The flavorings are generally utilized in amounts that will vary depending upon the individual flavor, and may, for example, range in amounts of about 0.5% to about 3% by weight of the final chewing gum composition weight and preferably about 0.7 to about 1.2%. The flavorings may be present in the delivery system, in the chewing gum composition itself, or both.

The colorants useful in the present invention, include the pigments such as titanium dioxide, that may be incorporated in amounts of up to about 1% by weight, and preferably up to about 6% by weight. Also, the colorants may include other dyes suitable for food, drug and cosmetic applications, and known as F.D. & C. dyes and the like. The materials acceptable for the foregoing spectrum of use are preferably water-soluble. Illustrative examples include indigoid dye, known as F.D. & C. Blue No. 2, which is the disodium salt of 5,5'-indigotindisulfonic acid. Similarly, the dye known as F.D. & C. Green No. 1, comprises a triphenylmethane dye and is the monosodium salts of 4-[4-Nethyl-p-sulfobenzylamino)diphenylmethylene]-[1-(N-ethyl-N-p-sulfoniumbenzyl)-2,5-cyclohexadienimine]. A full recitation of all F.D. & C. and D. & C. and their corresponding chemical structures may be found in the Kirk-Othmer Encyclopedia of Chemical Technology, in Volume 5, at Pages 857-884, which text is accordingly incorporated herein by reference.

The chewing gums of the invention may be in any form known in the art, such as stick gum, slab gum, chunk gum, shredded gum, hard coated gum, tabletted gum, as well as center-filled gum.

The process of preparing the inventive chewing gum compositions is as follows. The gum base is melted (about 85° to about 90°), cooled to 78° C. and placed in a pre-warmed (60° C.) standard mixing kettle equipped with sigma blades. The emulsifier is then added. Next, a portion of the sorbitol and the glycerin is added and mixed for an additional 3 to 6 minutes. The mixing kettle is cooled and mannitol and the remainder of the sorbitol and glycerin are then added and mixing is continued. At the time, the unflavored chewing gum temperature is about 39°-42° C. Flavor oil is then added and incorporated into the base and the mixing is continued. Finally, the delivery system containing the encapsulated sweetener material is added and mixed for an additional 1 to 10 minutes. The delivery system is added as the last ingredient. The final gum temperature is about 39° C.-43° C. The chewing gum composition is then discharged from the kettle, rolled, scored and formed into chewing gum pieces.

The following examples serve to provide further appreciation of the invention but are not meant in any way to restrict the effective scope of the invention. All percentages throughout the specification are by weight % of the final delivery system unless otherwise indicated.

EXAMPLES

Delivery systems were formulated, for use in chewing gum product, in accordance with the formulations given in Table I below. The control formulation (D) was taken from U.S. Pat. No. 4,597,970 to Yang, previously discussed above. The control delivery system formulation contained lecithin as a major component in the encapsulating material. In contrast, the inventive delivery systems (A-C) were devoid of the lecithin component.

TABLE I

| Ingredient | Delivery Systems - % weight | | | | Melting Point °C. |
|---|---|---|---|---|---|
| | (Inventive) | | | (Control) | |
| | A | B | C | D | |
| Aspartame | 17 | 17 | 17 | 17 | |
| Hard palm oil | — | — | — | 67 | 58-62° |
| Soybean oil (1) | 77 | 66 | 43 | — | 67-70° |
| Non-lecithin emulsifier (2) | 6 | 6 | 6 | — | 55-58° |
| Distilled monoglyceride | — | — | — | 8 | 67-70° |
| Polyethylene wax (3) | — | 11 | 34 | — | 87-93° |
| Lecithin | — | — | — | 8 | |
| | 100 | 100 | 100 | 100 | |

(1) partially hydrogenated
(2) glyceryl monostearate
(3) micro 195

The delivery systems from Table I were incorporated into the chewing gum compositions recited in Table II, below, and chewing gum product prepared therefrom. The gum pieces were the packaged in sealed pouches and subjected to accelerated aging conditions in ovens at 37° C. for periods of 4, 6, 8, 10 and 12 weeks, to allow sufficient time for potential instability to occur. It had been determined from previous experience that chemical interactions between constituents within the chewing gum composition would generally within this time frame.

All compositions were made without the addition of color additives, so that the final gum piece would appear white. After aging, however, all gums having lecithin as a component of the delivery systems acquired localized discoloration (red spots) indicative of a chemical reaction. The spots were distributed throughout the chewing gum piece. Additionally, the gum as a whole had become pink in hue as compared to its original white color. Those chewing gums with lecithin incorporated into both the delivery system as well as the gum composition, had a more intense pink color overall, as well as an increase in the number and color intensity of the spots.

The inventive chewing gum compositions used lecithin in the chewing gum formulation per se, but did not incorporate lecithin in the delivery system. After accelerated stability testing for twelve weeks, no indication of spotting or color changes was observed. The gum pieces remained substantially white, as did the control gums which were completely devoid of lecithin.

It is apparent from these results that the inventive delivery systems can be incorporated into a cinnamon flavored/aspartame sweetened chewing gum compositions without the stability problems due to chemical interactions which cause color changes and potentially alter taste and texture in the final product.

TABLE II

Chewing Gum Compositions Stability Tests - 37 C

| Ingredient - % weight | Inventive | | | Control(c) | | |
|---|---|---|---|---|---|---|
| | I | II | III | IV(a) | V | VI(b) |
| Gum Base | 27.0 | 27.0 | 27.0 | 27.0 | 27.0 | 27.0 |
| Lecithin | 0.5 | 0.5 | 0.5 | 0.5 | — | — |
| Polyol | 55.0 | 55.0 | 55.0 | 55.0 | 55.0 | 55.0 |
| Glycerin | 13.5 | 13.5 | 13.5 | 13.5 | 14.1 | 14.0 |
| Flavor | 2.1 | 2.1 | 2.1 | 2.0 | 2.0 | 2.0 |
| Delivery system | | | | | | |
| Inventive A | 1.9 | — | — | — | 1.9 | — |
| Inventive B | — | 1.9 | — | — | — | — |
| Inventive C | — | — | 1.9 | — | — | — |
| Control D (contains lecithin) | — | — | — | 2.0 | — | 2.0 |
| | 100 | 100 | 100 | 100 | 100 | 100 |

(a)U.S. Pat. No. 4,597,970
(b)U.S. Pat. No. 4,597,970
(c)lecithin was left out of both the chewing gum portion as well as the delivery system A summary of comparative stability results is listed in Table III below:

TABLE III

| Delivery System | Chewing Gum Composition | Color Change Indicating Instability |
|---|---|---|
| 1. Control - without lecithin | without lecithin | No color change; product remained stable (white) after 12 weeks/37° C. |
| 2. U.S. Pat. No. 4,597,970 - with lecithin | without lecithin | Localized red spotting; overall pink hue in product after 4 weeks/37° C. |
| 3. U.S. Pat. No. 4,597,970 - with lecithin | with lecithin | Localized red spotting distributed throughout the product; overall pink color intensified after 4 weeks/37° C. |
| 4. Inventive - without lecithin | with lecithin | No color change; product essentially as stable as control product after 12 weeks/37° C. |

Key
1. The control gum was formulated using the inventive delivery systems (Table I, Composition A) comprising soybean oil, glyceryl monostearate, and aspartame; the chewing gum portion was taken from composition III, Table II.
2. & 3. were chewing gum compositions made in accordance with U.S. Pat. No. 4,597,970.
4. The inventive composition demonstrated that eliminating lecithin in the delivery system and incorporating fatty materials and waxes having a melting point of about 106° C. or greater results in an unexpected increase in stability, which is manifested by the absence of chemical reactions which cause discoloration or color change in the final chewing gum product.

We claim:
1. A cinnamon flavored chewing gum composition having improved color, sweetener and flavor stability in the presence of amino acid or dipeptide sweeteners comprising a gum base, a cinnamon flavor and a stable sweetener delivery system capable of effecting a controlled release of the sweetener, said delivery system comprising an admixture of:
   (A) a hydrogenated or partially hydrogenated fat selected from the group consisting of soybean oil, palm oil, palm kernel oil, peanut oil, rapeseed oil, rice bran oil, cottonseed oil, sunflower oil, safflower oil and mixtures thereof;
   (B) polyethylene wax having a melting point of about 106° C. or greater;
   (C) glyceride in the amount of about 0.5% to about 20% by weight of the total chewing gum composition; and
   (D) an amino acid or dipeptide sweetener; wherein said sweetener is encapsulated by the admixture of components A through C.
2. The chewing gum composition of claim 1 wherein the sweetener is aspartame.
3. The chewing gum composition of claim 1 wherein elastomer in the gum base is selected from the group consisting of chicle, jelutong, balata, guttapercha, lechicaspi, sorva, butadiene-styrene copolymers, polyisobutylene, isobutylene-isoprene copolymers, polyethylene, polyvinylacetate, and mixtures thereof.
4. The chewing gum composition of claim 1 wherein there are additional sweeteners and/or flavors incorporated.
5. The chewing gum composition of claim 1 wherein there is additional incorporated a material selected from the group consisting of fillers, emulsifiers, coloring agents, plasticizers, bulking agents, viscosity modifiers and mixtures thereof.
6. The chewing gum composition of claim 1 wherein the fat is present in amounts of about 63% to about 90% by weight of the total chewing gum composition.
7. The chewing gum composition of claim 1 wherein the polyethylene wax is present in amounts of about 1% to about 25% by weight of the total chewing gum composition.
8. The chewing gum composition of claim 1 wherein the molecular weight of the polyethylene wax is in the range of about 500 to about 10,000.
9. The composition of claim 1 wherein the glyceride is glyceryl monostearate.

* * * * *